Dec. 29, 1942.   W. H. CHURCHILL   2,306,801
ROTARY FASTENER DEVICE AND INSTALLATION OF SAME
Filed June 25, 1941   2 Sheets-Sheet 1

Inventor:
Wilmer H. Churchill.
by John Todd   Atty.

Dec. 29, 1942.   W. H. CHURCHILL   2,306,801
ROTARY FASTENER DEVICE AND INSTALLATION OF SAME
Filed June 25, 1941   2 Sheets-Sheet 2
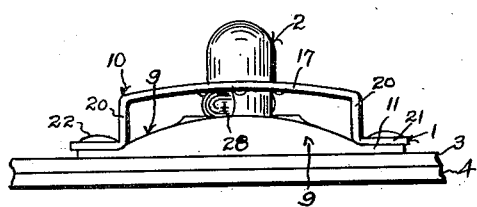
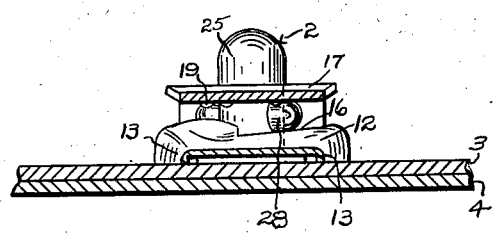
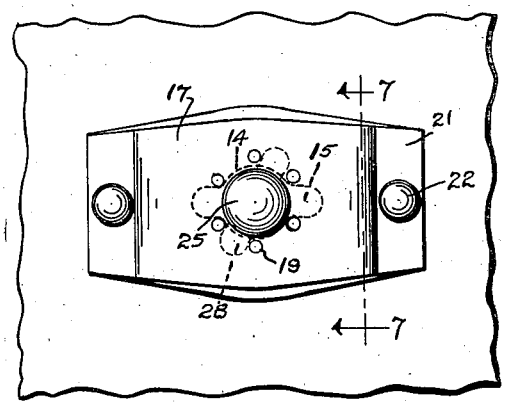
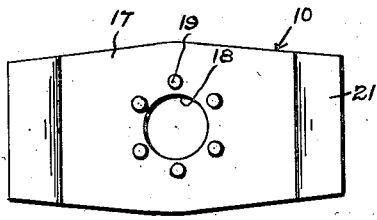
Inventor:
Wilmer H. Churchill
By John Todd Att'y.

Patented Dec. 29, 1942

2,306,801

UNITED STATES PATENT OFFICE 2,306,801

ROTARY FASTENER DEVICE AND INSTALLATION OF THE SAME

Wilmer H. Churchill, Saugus, Mass., assignor to United-Carr Fastener Corporation, Cambridge, Mass., a corporation of Massachusetts Application June 25, 1941, Serial No. 399,758

10 Claims. (Cl. 24—221)

This invention relates to improvements in fastener devices for securing together two or more implements, preferably plate-like, the device being of the so-called rotary operative type and adapted to draw the plates tightly together on rotation of one part relative to the other.

The chief object of my invention is the provision of a socket unit for cooperation with a rotary unit, the socket unit providing a rigid element having an inclined surface which is engaged by a lateral projection of the rotary unit and a spring element in superposed relation to the rigid element adapted to cooperate with the lateral projection of the rotary element to maintain the projection in firm engagement with the inclined surface of the rigid element.

Another object of my invention is the provision of a socket unit which is universal to varying combined thicknesses of the plates to be secured.

Other objects and uses of my invention will be apparent from inspection of the drawings and specification below set forth.

Referring to the drawings which illustrate a preferred embodiment of my invention:

Fig. 6 is a side elevation of the parts of my improved fastener device in fastened assembly;

Fig. 7 is a sectional view taken along the lines 7—7 of Fig. 8;

Fig. 8 is a top plan view of the installation shown in Fig. 6; and

Fig. 9 is a bottom view of the yieldable element of my improved socket unit.

Figure 5:
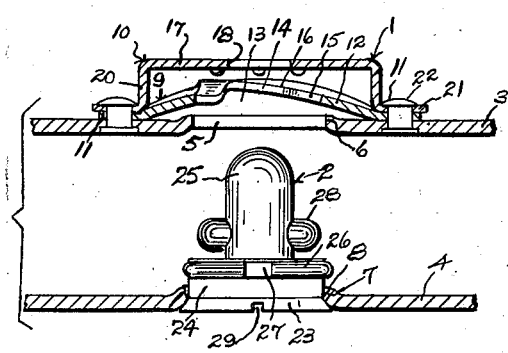
Fig. 5 is a sectional view along the line 5—5 of Fig. 1 and showing the cooperating rotary unit in position to engage the socket unit.

Referring to the preferred form of my fastener device, illustrated in the drawings, the device comprises two units, namely: a socket unit 1 and a rotary unit 2. The socket unit 1 is secured on one side of a flat supporting panel 3 and the rotary unit 2 is secured on one side of a supporting panel 4 (Fig. 5). The panel 2 in my preferred form has an opening 5 surrounded by a frustro-conical embossment 6. The panel 4 has an opening 7 for receiving a portion of the rotary unit surrounded by an embossment 8. The embossments 8 and 6 are substantially complementary to each other so that the panel 4 may present a flush outer surface when the rotary unit is finally assembled with the same.

Figure 1:
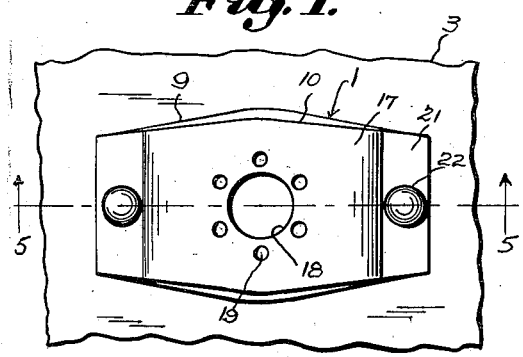
Fig. 1 is a top plan view of my improved socket unit secured in assembly with a supporting panel.
Figure 2:
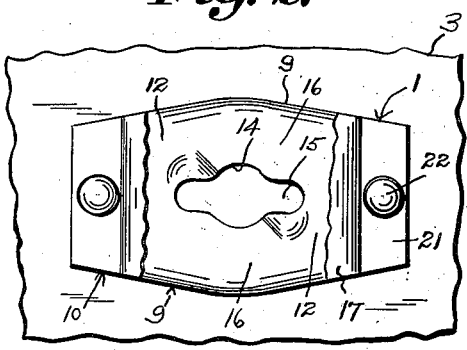
Fig. 2 is a view similar to Fig. 1, but with one of the elements broken away to show the construction of the unit.
Figure 3:
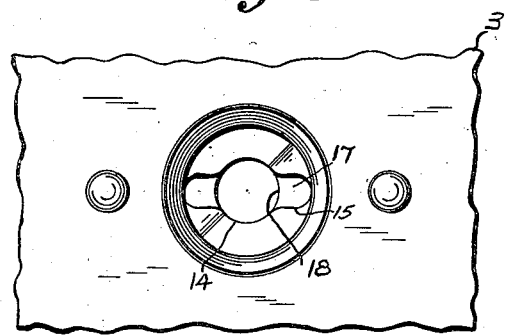
Fig. 3 is a bottom view of the installation shown in Fig. 1.
Figure 4:
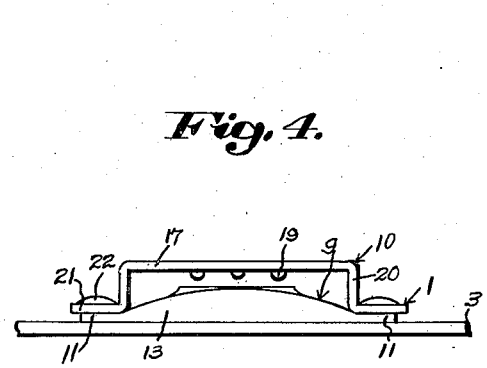
Fig. 4 is a side elevation of the installation shown in Fig. 1.

Referring in detail to the construction of my improved socket unit 1 I have shown one preferably formed of two parts of sheet metal including a rigid or plate-like element 9 and a superposed yieldable element 10. The rigid element 9 has end portions 11 adapted to be secured in abutting relation to the inner surface of the panel 3 and a raised body 12 between the end portions. The body 12 is preferably supported by integral rigid side walls 13 which extend from the body in substantially normal relation thereto and engage the inner surface of the panel 3 at their edges so that the body portion is substantially non-yieldable relative to the panel 3. The body 12 has a central opening 14 (Fig. 2) and slot 15 in the form of narrow elongations of the central opening and extending on opposite sides of the same. On opposite sides of the opening 14 inclined or locking surfaces 16 extend from a low point adjacent one of the slots 15 to a high point adjacent the other slot 15.

Referring in detail to the construction of the superposed element 10 the element comprises a flexible plate-like portion 17 having a central opening 18 adapted to be disposed in superposed registering relation to the opening 14 of the rigid element when the parts of the socket member are in final assembly. The plate-like portion 17 has a number of projections 19 disposed in an annular series around the central opening 18 and extending out of the plane of the plate-like portion 17 toward the body 12 of the rigid element. The elements overlie the inclined surfaces 16 and are spaced a predetermined distance from the same for the purpose to be described. I have preferably shown the projections 19 in the form of dimples pressed out of the material of the plate portion 17 but it is understood that these projections may be of different form and constructed in other ways, such as by shearing ears or lugs from the metal or by providing corrugations extending radially from the opening 18. Leg portions 20 extend from the ends of the plate-like portions 17 in planes substantially normal to the plane of the plate-like portion and outwardly extending flange portions 21 are provided at the free ends of the leg portions 20. It will be seen that the leg portions 20 operate to support the plate portion 17 and maintain the same in spaced relation to the rigid element 9. At the same time the legs are spaced far enough apart to permit the plate-like portion 17 to yield therebetween. The flange portions 21 serve as means for securing the superposed element 10 in assembly with the rigid element 9 and panel 3.

Assembly of the parts of my improved socket unit is a very simple matter and is carried out by disposing the yieldable element 10 upon the rigid element 9 with the flange portions 21 of the yieldable element abutting the end portions 11 of the rigid element. Rivets 22 are extended through the panel 3 and aligned openings of the respective abutting flange portions 21 and end portions 11 and headed over to secure the parts of the socket unit in assembly with each other and with the panel 3 as most clearly shown in Fig. 5.

The rotary unit 2 comprises a head portion 23 which is larger in diameter than the opening 7 of the panel 4 and a shank having a base 24 which is slightly smaller in diameter than the aperture 7. The shank has a nose 25 which is adapted to extend through the opening 14 of the rigid element 9 and the opening 18 of the yieldable element 10. The rotary unit 2 is preferably secured in assembly with the panel 4 by a split ring 26 which is snapped into a groove 27 of the base 24 as most clearly shown in Fig. 5. A pin 28 is driven or otherwise secured in the aperture of the nose 25 so that opposite ends of the pin extend laterally beyond the shank on opposite sides thereof in a direction transverse to the normal axis of the shank. The head 23 has a slot 29 to receive a tool or suitable implement by which the unit may be rotated.

In fastening the panel 4 to the panel 3 the panels are brought into substantially abutting relation with the nose 25 of the rotary unit projecting through the opening 6 of the panel 3 and the aligned openings 14 and 18 of the socket elements. When the parts are in this position the pin 28 is in registration with the slots 15 of the body element 12. Thereafter, the rotary element is turned in a counter-clockwise direction viewing Fig. 8 causing the pin ends to engage and ride up the inclined surface 16 drawing the panel 4 tightly against the panel 3. During this action the pin ends will reach a point in their rotary movement in which the diameter of the same is less than the distance between certain of the projections 19 and the inclined surface 16. Continued rotation of the rotary unit will cause the pin ends to expand the yieldable plate 17 and snap by the projections 19 after which action the plate 17 will return to normal shape causing the projections 19 to enter cooperate fastener engagement with the pin ends to maintain the same in engagement with the inclined surface and prevent rotation of the stud unit in a reverse direction. It will be seen that by having a number of projections 19 disposed in an annular series around the opening 18 of the plate-like portion 17 a universal fastener is effected which operates to compensate for variations in the combined thickness of the panels 3 and 4. Thus, it will be seen that although in my preferred installation I have shown the panels 3 and 4 of such combined thickness that the pin ends snap by the first projection in their rotary movement to full fastened engagement with the rigid element, if the combined thickness of the panels were less, the pin ends would not reach full fastened engagement with the rigid element until they had been moved by the second projection. It is understood that although I have chosen to use sets of two projections for cooperation with the pin ends, the number could be increased or reduced or the relative dimensions of parts of the units altered without departing from the scope and purpose of my invention.

Although I have illustrated and described the preferred embodiment of my invention I do not wish to be limited thereby because the scope of my invention is best defined by the following claims.

I claim:

1. In a fastener device of the rotary operative type, a socket unit having fastening means whereby it may be secured to one of the parts to be fastened, said unit comprising two superposed elements at least one of which is yieldable, a cooperating rotary fastening element carried by another of the parts to be fastened, said rotary element having projecting means movable between said superposed elements and said superposed elements having projection-engaging means between them cooperating to retain said rotary fastening element in engagement with said socket unit and at least one of said superposed elements having an aperture of a size and shape to permit free axial passage of the rotary element in at least one position of the parts.

2. In a fastener device of the rotary operative type, a socket unit adapted to be secured to one of the parts to be fastened, said unit comprising two superposed elements one of which is yieldable and the other of which is relatively rigid and has an aperture therethrough, a cooperating rotary fastening element carried by another of the parts to be fastened, said rotary element having projecting pin-like means movable between said superposed elements, and said yieldable element having locking means extending toward the other element and cooperating with said rotary element to maintain said projecting pin-like means in engagement therewith.

3. In a fastener device of the rotary operative type, a socket unit adapted to be secured to one of the parts to be fastened, said unit comprising two superposed elements one of which is rigid and the other yieldable, a cooperating rotary fastening element carried by another of the parts to be fastened, said rotary element having means movable between said superposed elements, said yieldable element being flexed by said rotary element during movement of said rotary member therebetween and one of said elements having a projection extending toward the other of said elements and cooperating with said rotary element to maintain said means in fastened engagement with said socket unit.

4. In a fastener device of the rotary operative type, a socket unit adapted to be secured to one of the parts to be fastened, said unit comprising a rigid element and a yieldable element in superposed relation to said rigid element, said rigid element having an aperture and an inclined surface adjacent said aperture, a rotary member having a shank adapted to pass through the aperture in said rigid element and having a lateral projection adapted to engage said inclined surface between said elements upon relative rotation of the parts, said yieldable element being flexed by said rotary element during movement of said rotary member between said elements and said yieldable element having a projection extending toward said rigid element and cooperating with said projection of said rotary element to maintain the same in engagement with said rigid element.

5. In a fastener device of the rotary operative type, a socket unit adapted to be secured to one of the parts to be fastened, said unit comprising a rigid plate-like element secured at its ends to said part and a yieldable element, said rigid element having an aperture and an inclined surface adjacent said aperture, said yieldable element having a yieldable plate-like portion in superposed relation to said rigid element, said plate-like portion having a projection extending in the direction of said rigid element and spaced a predetermined distance from said inclined surface thereof, a rotary member having a shank adapted to pass through the aperture in said rigid element and having a lateral projection adapted to engage said inclined surface between said surface and said yieldable plate portion, and said lateral projection being adapted to snap by said projection of said yieldable element whereby it is maintained in engagement with said inclined surface.

6. In a fastener device of the rotary operative type, a socket unit adapted to be secured to one of the parts to be fastened, said unit comprising a rigid plate-like element secured at its ends to said part and a yieldable element, said rigid element having an aperture and an inclined surface adjacent said aperture, said yieldable element having a yieldable plate-like portion in superposed relation to said rigid element, said plate-like portion having an opening in alignment with said opening of said rigid element, said plate-like portion having a projection extending in the direction of said rigid element and spaced a predetermined distance from said inclined surface thereof, a rotary member having a shank adapted to pass through said apertures of said elements and having a lateral projection adapted to engage said inclined surface between said surface and said plate-like portion, and said lateral projection being adapted to snap by said projection of said yieldable element whereby it is maintained in engagement with said inclined surface.

7. In a fastener device of the rotary operative type, a socket unit adapted to be secured to one of the parts to be fastened, said unit comprising a rigid plate-like element secured at its ends to said part and a yieldable element, said rigid element having an aperture and an inclined surface adjacent said aperture, said yieldable element having a yieldable plate-like portion in superposed spaced relation to said rigid element, attaching portions extending from said plate-like portion and secured in assembly with said rigid element whereby said parts of said socket unit are assembled together, said plate-like portion having an opening in alignment with said opening of said rigid element, said plate-like portion having a projection extending in the direction of said rigid element and spaced a predetermined distance from said inclined surface thereof, a rotary member having a shank adapted to pass through said apertures of said elements and having a lateral projection adapted to engage said inclined surface between said surface and said plate-like portion, and said lateral projection being adapted to snap by said projection of said yieldable element whereby it is maintained in engagement with said inclined surface.

8. In a fastener device of the rotary operative type, a socket unit adapted to be secured to one of the parts to be fastened, said unit comprising a pair of superposed elements one of which is yieldable, a rotary element carried by another of the parts to be fastened, said rotary element being movable between said superposed elements, one of said superposed elements having a series of projections extending toward the other of said elements, and one of said projections cooperating with said rotary element at a predetermined point in the rotary movement of said rotary element to maintain said rotary element in fastened engagement with said socket unit.

9. In a fastener device of the rotary operative type, a socket unit adapted to be secured to one of the parts to be fastened, said unit comprising a rigid plate-like element secured to said part and a yieldable element, said rigid element having an aperture and an inclined surface adjacent said aperture, said yieldable element having a yieldable plate-like portion in superposed relation to said rigid element, said plate-like portion having an opening in alignment with said opening of said rigid element, a rotary member having a shank adapted to pass through said apertures of said elements and having a lateral projection adapted to engage said inclined surface between said surface and said plate-like portion, and said plate-like portion having a series of projections disposed annularly around said opening thereof and extending toward said rigid element, and one of said projections cooperating with said lateral projection at a predetermined point in the rotary movement of said rotary element to maintain said lateral projection in engagement with said inclined surface.

10. In a rotary operative type fastening installation, a plurality of supporting members to be fastened, a socket device having means whereby it may be permanently attached to a supporting member and including a plate-like portion secured directly over an aperture in that supporting member and having an aperture in alignment with the aperture in the supporting member and a superposed yieldable means spaced from the plate-like portion, a cooperating rotary fastening stud assembled with another supporting member and having a shank portion passing through the aperture in the first-mentioned supporting member and also through the plate-like portion of the socket and a single crosspin extending through said shank so as to project at opposite sides thereof normal to the axis of the stud and engageable with said superposed yieldable means of the socket member when rotated and crosspin-engaging means presented by the superposed yieldable means to engage the crosspin and hold the stud in at least one predetermined position relative to the socket.

WILMER H. CHURCHILL.